July 16, 1957  A. W. CORWIN  2,799,747
ELECTRICAL SWITCH

Filed Feb. 1, 1954  2 Sheets-Sheet 1

INVENTOR.
Alfred W. Corwin
BY Lee H. Kaiser
Attorney

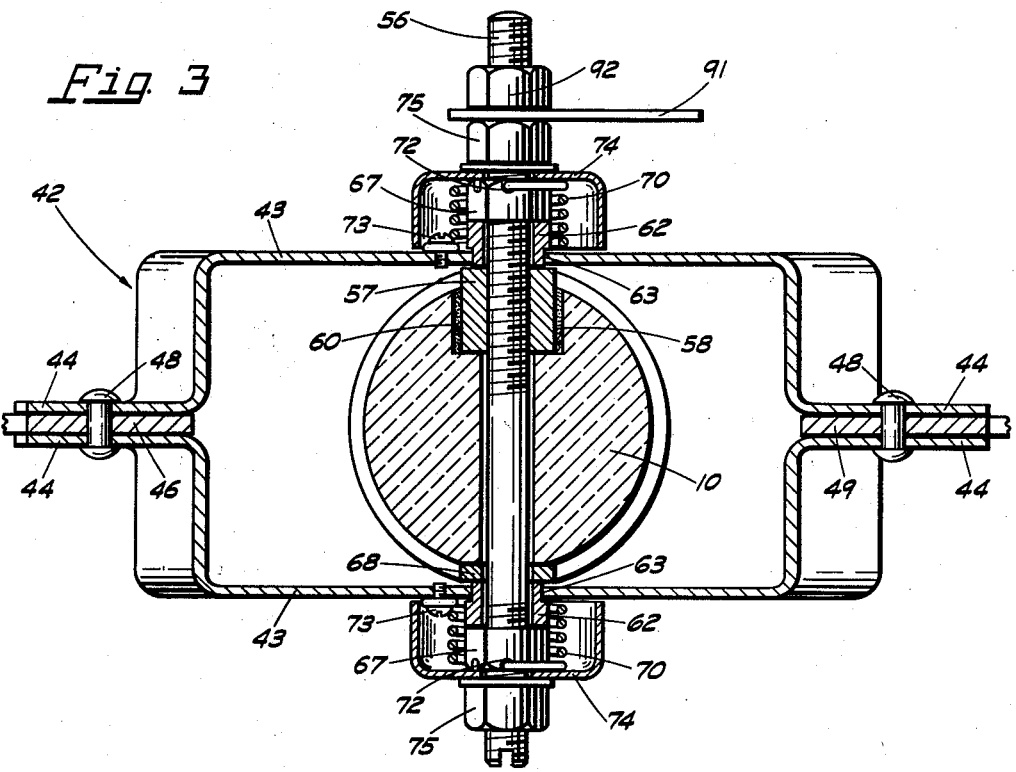

2,799,747
Patented July 16, 1957

United States Patent Office

2,799,747
ELECTRICAL SWITCH

Alfred W. Corwin, Milwaukee, Wis., assignor to McGraw-Edison Company, a corporation of Delaware Application February 1, 1954, Serial No. 407,345

5 Claims. (Cl. 200—118)

This invention relates to electrical switches.

The switch of the present invention is particularly suited for use in a system for protecting star-connected capacitor banks disclosed in the application of Blaine H. Schultz and Peter M. Minder, Serial No. 357,996, filed May 28, 1953, and having the same assignee as the present invention, wherein a current responsive device between the neutrals of two groups of star-connected capacitors is adapted to ground both of the neutrals upon failure of a capacitor in either of the groups.

It is an object of the invention to provide a current responsive electrical switch adapted to normally electrically connect a first and a second electrical terminal and to connect both of said terminals to a third terminal upon the flow of a predetermined current between the first and second terminals.

It is a further object of the invention to provide a current responsive electrical switch adapted to connect the neutrals of two star-connected groups of capacitors having their neutrals isolated from the system neutral and to ground both of said neutrals upon a failure of a capacitor in either of the groups.

These and other objects of the invention will become apparent upon consideration of the following detailed description of the preferred embodiment thereof, when taken in connection with the attached drawings in which:

Fig. 3 is a section view taken on line 3—3 of Fig. 1; and

Fig. 4 is a circuit diagram schematically illustrating the use of the invention in a system for protecting star-connected capacitor banks.

Figure 1:
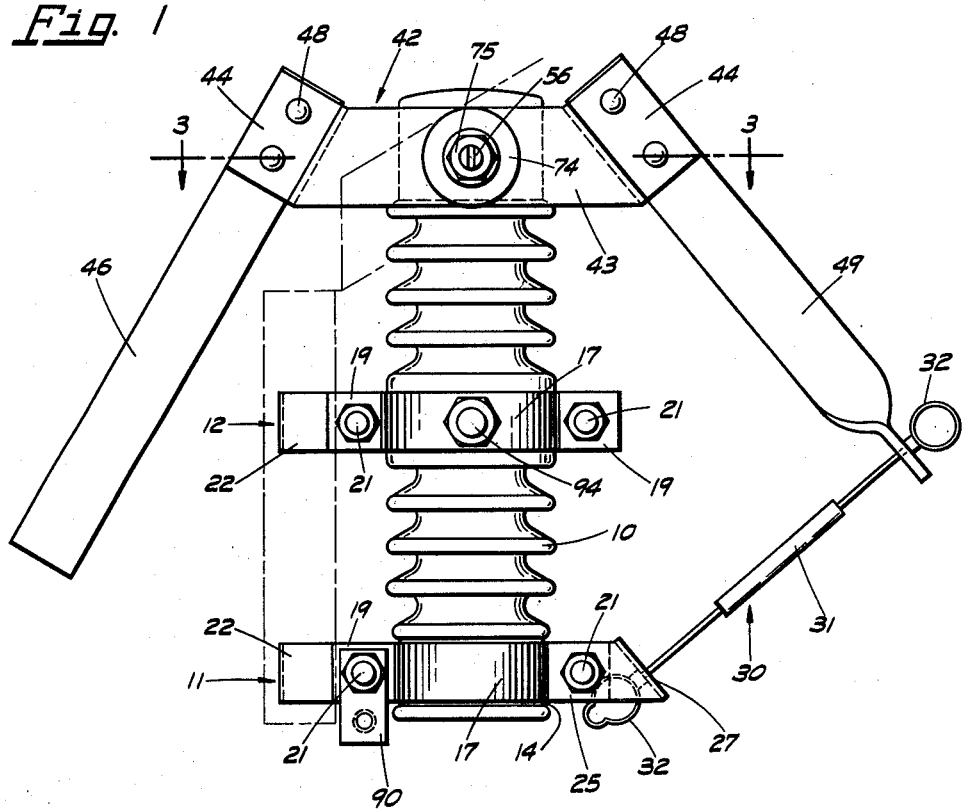
Fig. 1 is a view in front elevation of the preferred embodiment of the invention with the closed position of the switch blade shown in dotted lines.
Figure 2:
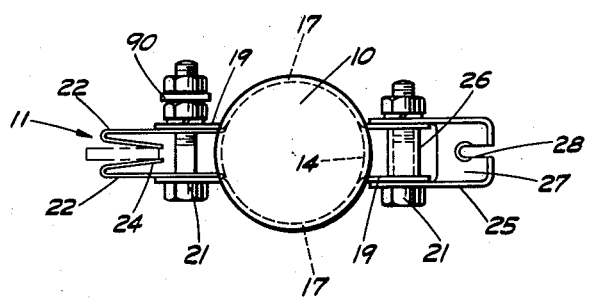
Fig. 2 is a fragmentary bottom view of Fig. 1 with the switch blade in closed position shown in dotted lines.

Referring to Fig. 1, an elongated insulator 10, preferably of the porcelain type, has mounted thereon a first stationary contact jaw 11 at one end and a second stationary contact jaw 12 intermediate its ends. The stationary jaws 11 and 12 are similar, and only the first jaw 11, which is best seen in Fig. 2, will be described. A circumferential groove 14 in the exterior periphery of the insulator 10 receives a pair of diametrically opposed metallic clamping bands 17 each having a central arcuate portion from which extend limbs 19 having clearance apertures for the passage of through bolts 21 that fasten the clamping bands 17 to the insulator 10. Generally J-shaped spring contact members 22 disposed between the limbs 19 on one side of the insulator 10 have inwardly pressed spring fingers 24 together forming a contact jaw which provides high pressure contact against a switch blade inserted therebetween. The members 22 are of resilient metal, preferably Phosphor bronze, and have clearance apertures for the passage of the through bolt 21.

The spaced apart legs 25 of a generally U-shaped, metallic, fuse link holding member are positioned exterior of the limbs 19 of the clamping bands 17 on the side of the insulator 10 away from the spring fingers 24. Registering clearance holes are provided in the spaced apart legs 25 for a bolt 21 which clamps the contiguous legs 25 and limbs 19 against a sleeve 26 circumjacent the bolt. The plane of the cross-bar 27 of the U-shaped member is at an oblique angle to the axis of the insulator 10, and a slot 28 is provided in the cross-bar 27 to receive one end of a fuse link 30 of desired current rating. The fusible element (not shown) of the link 30 is surrounded by an arc extinguishing insulating sleeve 31 and connected by flexible conductors to eyelets 32 which prevent removal of the fuse link 30 from the slot 28 in an axial direction.

A cradle 42 pivotally mounted at the end of the insulator 10 opposite the first jaw 11 has a four-sided central portion formed by opposed metallic side members 43 of U-shaped horizontal cross section disposed on opposite sides of the insulator 10. The side members 43 have wing portions 44 extending radially from the central portion of the cradle on both sides of the insulator 10. A switch blade 46 is positioned between and rigidly secured by rivets 48 to the wing portions 44 on the same side of the insulator 10 as the spring fingers 24. In Figs. 1 and 2 the closed position of the switch blade 46 is shown in dotted lines. A metallic extension arm 49 is positioned between and rigidly affixed to the wing portions 44 on the side of the insulator 10 opposite the switch blade 46. Intermediate its ends the extension arm 49 is twisted to position the plane of the free end thereof parallel to the plane of the cross-bar 27 of the fuse link retaining member, and a slot (not shown) is provided in the free end of the extension arm 49 to receive one end of the fuse link 30.

A bolt 56 extending through a bore in the insulator 10 is threaded within a cylindrical metallic insert 57 which is cemented by sealing compound 58 within a counterbore 60 in the insulator 10. Cylindrical bearing members 62 circumjacent the bolt 56 on opposite sides of the insulator 10 have reduced diameter portions forming circumferential grooves 63 which have an axial length greater than the thickness of the side members 43. Registering apertures provided in the spaced apart side members 43 of the cradle member 42 receive the reduced diameter portions 63 of the bearing members 62 to provide bearing support for the cradle member 42. Nuts 67 threaded on the bolt 56 retain one bearing member 62 against the insert 57 on one side of the insulator 10 and the second bearing support member 62 against a washer 68 circumjacent the bolt 56 on the opposite side of the insulator. The side members 43 are thus prevented from lateral movement by the shoulders formed at the circumferential grooves 63.

The members 62 provide bearings for pivotally mounting the cradle 42 which is rotatably urged by torsion springs 70 circumjacent the nuts 67 to move the switch blade 46 into closed position in engagement with the contact fingers 24 of both the first and second stationary contact jaws 11 and 12. One end of each torsion spring 70 is bent radially inward and fits within a radial groove 72 provided in the exterior face of a nut 67. A plurality of radial grooves are provided in the exterior face of each of the nuts 67 to permit adjustment of the torque exerted by the torsion springs 70. The other end of each torsion spring 70 is affixed to a stud 73 secured to a side member 43. Cup-shaped spring housings 74 having axial clearance apertures are secured on the bolt 56 by nuts 75.

Fig. 4 schematically illustrates the use of the invention in the system for protecting star-connected groups of capacitors disclosed in the aforementioned application, Serial No. 357,996. A bank of capacitors connected in Y to the phase conductors 80, 81, and 82 of a three phase alternating current power circuit is split into two parallel groups 84 and 85 of capacitors. A fuse 86 protects each phase conductor. A neutral line 87 connects the neutrals 88 and 89 of the capacitor groups 84 and 85 respectively.

An electrical terminal 90 secured on a bolt 21 of the first contact jaw 11 is electrically connected to the portion of the line 87 leading to the neutral 89. An electrical terminal 91 (see Fig. 3) secured to the bolt 56 by a nut 92 is electrically connected to the portion of the line 87 leading to the neutral 88. A bolt 94 through the arcuate portion of both clamping bands 17 of the second stationary contact jaw 12 and through the insulator 10 permits mounting of the switch and also permits grounding of the stationary contact jaw 12. The neutrals 88 and 89 are electrically connected through the fuse link 30 which mechanically latches the cradle 42 against rotation under the forces of the torsion springs 70, and thus prevents movement of the switch blade 46 into electrical engagement with the stationary contact jaws 11 and 12.

A failure of any capacitor of either group 84 or 85, resulting in a shift of the corresponding neutral 88 or 89, causes current flow through the fuse link 30. A predetermined current flow between terminals 90 and 91 ruptures the fuse link 30 and permits the cradle 42 to rotate under the forces exerted by the torsion springs 70 to move the switch blade 46 into closed position in engagement with the spring fingers 24 of both the first stationary contact jaw 11 and the second stationary contact jaw 12 to thus ground the neutrals 88 and 89 of both capacitor banks.

Although but one embodiment of the invention has been shown and described in detail, it will be understood that other embodiments are possible and that various changes may be made in the design and arrangement of parts without departing from the spirit of the invention.

What I claim as new and desire to secure by Letters Patent of the United States is:

1. An electrical switch, comprising, in combination, an insulator, a pair of stationary contacts mounted in spaced relation on said insulator, a switch blade pivotally mounted on said insulator in spaced and insulated relation to said stationary contacts and adapted when in closed position to engage both of said stationary contacts, said blade having terminal means permitting electrical connection thereto, means biasing said blade to closed position, and current sensitive rupturable means engaging said blade and normally providing a continuous electrical connection between said blade and one of said stationary contacts for normally retaining said blade in open position, whereby flow of a predetermined current in an electrical circuit in series with said current sensitive means will release said blade to closed position to electrically common said blade and both said stationary contacts.

2. An electrical switch, comprising, in combination, an insulator, a pair of stationary contact jaws mounted in spaced apart position on said insulator, a metallic member pivotally mounted on said insulator in spaced apart relation to said contact jaws and electrically insulated from both of said jaws, said member having a switch blade extending therefrom on one side of said insulator and having a metallic arm extending therefrom on the opposite side of said insulator, said arm being electrically commoned with said blade and said member, terminal means electrically connected to said blade and insulated from both of said contact jaws, said switch blade being adapted to engage both of said contact jaws when said member is pivoted to move said switch blade to closed position, spring means urging said member to move said switch blade to closed position, and a fuse link electrically connecting said arm and one of said stationary contacts and normally latching said member with said switch blade in open position.

3. An electrical switch comprising, in combination, an elongated insulator, a first stationary contact mounted on and secured to said insulator intermediate its ends, a second stationary contact mounted on and secured to one end of said insulator in spaced and insulated relation to said first contact, a pivot element extending through said insulator at the end thereof opposite said second contact, a metallic member having spaced apart portions on opposite sides of said insulator pivotally mounted on said pivot element and including terminal means, a switch blade rigid with said member extending and movable in a plane coincident with said first and second contacts, said blade being movable between open and closed positions and adapted when in closed position to engage both said first and said second stationary contacts, spring means circumjacent said pivot element and rotatably urging said member to move said switch blade to closed position, a metallic arm rigid with said member extending therefrom on the side of the insulator opposite that of said blade, said arm being electrically commoned with said member and said blade, and rupturable fuse link means engaging said arm and one of said stationary contacts and normally latching said member with said switch blade normally in open position.

4. A device adapted to normally electrically connect two portions of an electrical circuit normally at the same potential and to connect both of said portions to a third portion of said circuit upon the flow of a predetermined overcurrent through said device between said two portions, comprising, in combination, an insulating member, a first stationary contact secured to said insulating member and including terminal means permitting connection to one of said portions of said circuit, a second stationary contact secured to said insulating member in spaced apart and insulated relation to said first contact and also including terminal means permitting connection to one of said portions of said circuit, a movable contact member pivotally mounted on said insulating member in spaced apart and insulated relation to both of said stationary contacts and adapted when in closed position to engage both of said stationary contacts, said movable contact member including terminal means permitting electrical connection to one of said portions of said circuit, spring means biasing said movable contact member to closed position, and current sensitive rupturable means engaging said movable contact member and normally providing a continuous electrical connection between one of said stationary contacts and said movable contact member and normally latching said movable contact member in open position.

5. A device adapted to normally electrically connect two portions of an electrical circuit normally at the same potential and to connect both of said portions to a third portion of said circuit upon the flow of a predetermined current through said device between said two portions, comprising, in combination, an elongated insulator, a first stationary contact secured to said insulator intermediate the ends thereof and carrying terminal means permitting connection to one of said portions of said circuit, a second stationary contact secured to said insulator adjacent one end thereof in insulated relation to said first contact and carrying terminal means also permitting connection to one of said portions of said circuit, a pivot pin extending through and affixed to the opposite end of said insulator, a metallic member having spaced apart portions disposed on opposite sides of said insulator each having an aperture receiving said pin to pivotally mount said member on said pin, a knife blade rigid with and extending from said member on one side of said insulator and adapted to electrically engage both of said stationary contacts when said member is pivoted, a metallic arm rigid with and extending from said member on the side of said insulator opposite from said knife blade, said arm being electrically commoned with said member and said blade, terminal means on said pin electrically connected to said blade and said arm and permitting connection to one of said portions of said circuit, spring means urging said member in a direction to engage said knife blade with both of said stationary contacts, and a fuse link connecting said arm and one of said stationary contacts and latching said member with said knife blade disengaged from both of said stationary contacts.

References Cited in the file of this patent

UNITED STATES PATENTS

| | | |
|---|---|---|
| 1,745,735 | Burdick | Feb. 4, 1930 |
| 2,135,787 | Birkenmaier | Nov. 8, 1938 |
| 2,150,249 | Sanford | Mar. 14, 1939 |
| 2,265,765 | Schultz et al. | Dec. 9, 1941 |
| 2,418,017 | Ellicock | Mar. 25, 1947 |
| 2,511,236 | Bartz | June 13, 1950 |
| 2,535,271 | Denslow | Dec. 26, 1950 |
| 2,548,617 | Purpura | Apr. 10, 1951 |

FOREIGN PATENTS

| | | |
|---|---|---|
| 150,489 | Great Britain | Sept. 9, 1920 |